United States Patent [19]

Kojima et al.

[11] 4,398,841

[45] Aug. 16, 1983

[54] COLUMN-TO-BEAM CONNECTOR

[75] Inventors: Hajime Kojima, Hirakatashi; Yukio Kurita, Neyagawashi; Kazuhiko Hirata; Satoshi Nakagawa, both of Hirakatashi; Takahira Ueoka, Kadomashi, all of Japan

[73] Assignee: Matsushita Electric Works, Ltd., Osaka, Japan

[21] Appl. No.: 163,881

[22] Filed: Jun. 27, 1980

[30] Foreign Application Priority Data

Nov. 30, 1979 [JP] Japan ............... 54-156245

[51] Int. Cl.³ .............. F16B 7/00; E04B 1/343; E04B 1/58
[52] U.S. Cl. .................. 403/173; 52/280; 52/645
[58] Field of Search ........... 52/665, 726, 638, 637, 52/280, 645; 5/296; 403/172, 173, 174, 175; 211/182, 148, 178 R; 182/178

[56] References Cited

U.S. PATENT DOCUMENTS

| 572,412 | 12/1896 | Curtis | 5/296 |
|---|---|---|---|
| 792,366 | 6/1905 | Taylor | 5/296 |
| 2,237,572 | 4/1941 | Manion | 52/637 |
| 3,097,730 | 7/1963 | Halle | 403/173 |
| 3,353,852 | 11/1967 | Wood | 52/726 |
| 3,386,590 | 6/1968 | Gretz | 211/182 |
| 3,711,133 | 1/1973 | Werner | 403/172 |
| 3,936,111 | 2/1976 | Mazzucconi | 211/182 |

FOREIGN PATENT DOCUMENTS

| 532723 | 11/1954 | Belgium | 52/637 |
|---|---|---|---|
| 2645834 | 3/1977 | Fed. Rep. of Germany | 403/172 |
| 1406373 | 6/1965 | France | 182/178 |

*Primary Examiner*—John E. Murtagh
*Attorney, Agent, or Firm*—John O. Graybeal

[57] ABSTRACT

The coupler portion of a connector assembly for interconnecting vertical columns and horizontal beams includes a rectangularly shaped hollow block member having a vertical row of slots formed along the height of each of its sidewalls. The block member is connectable to the top or bottom of a vertical column or between two abutting vertical columns by a joiner insert composed of a flat flange section and a transverse stud section extending normally outwardly from one side of the flange to engage within a central hole provided in the end wall of the hollow block member. The joiner insert also includes a plug section extending normally outwardly from the flange section in a direction opposite the stud section to engage within a socket formed in the end portion of each column. The connector assembly also includes a T-shaped bracket engageable within a vertical slot formed in each end portion of the horizontal beams. The bracket includes a plurality of vertically spaced apart downwardly open hooks which slidably engage within, and securely lock with, the block member slots to thereby interconnect the horizontal beams with the end portion of a column or between the ends of two vertically abutting columns.

8 Claims, 9 Drawing Figures

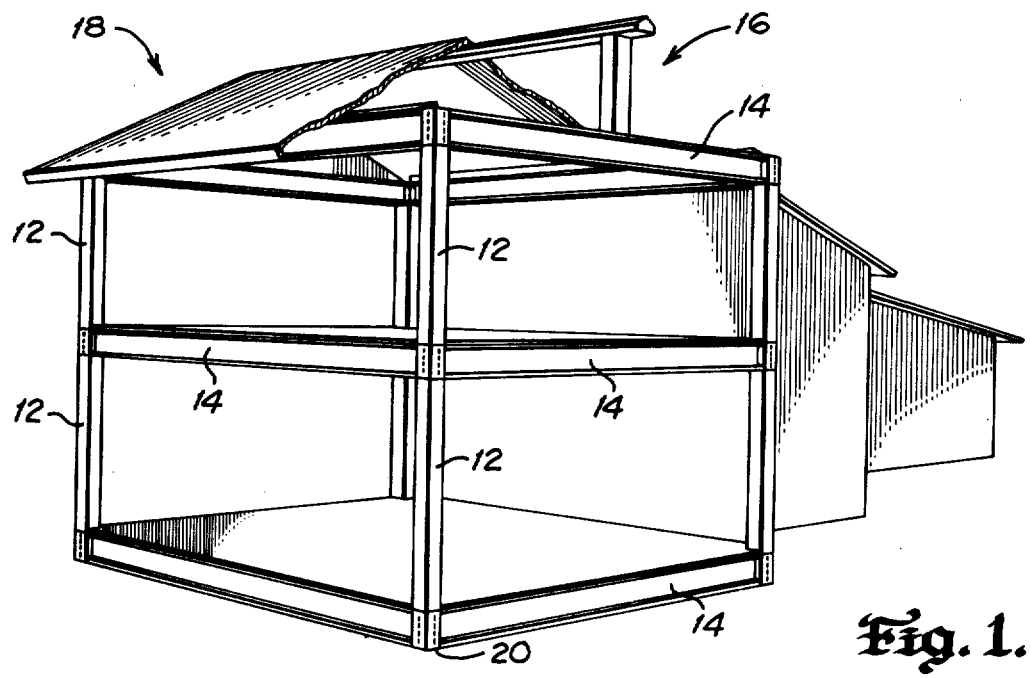
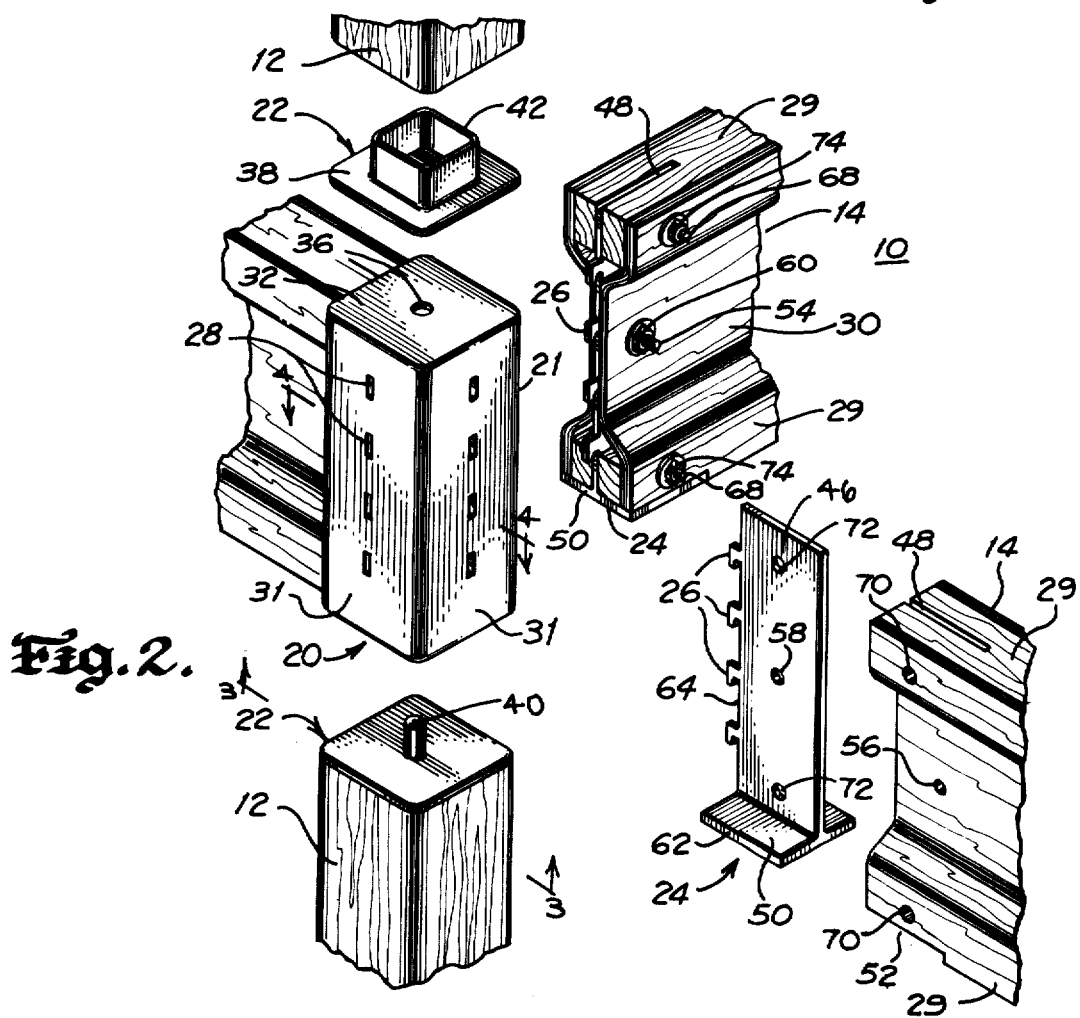

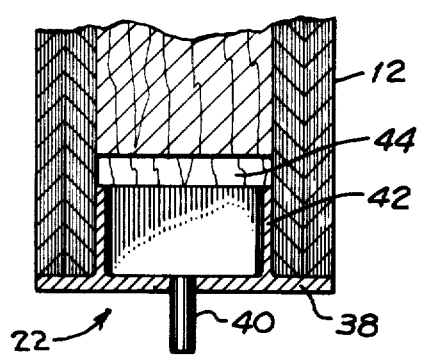
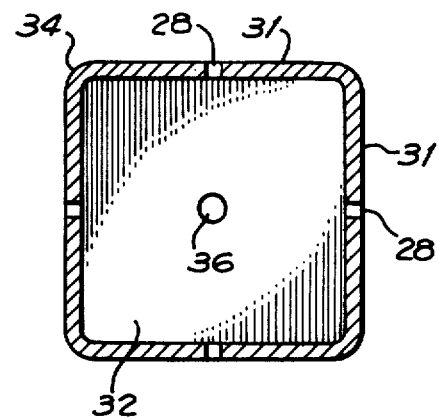
Fig. 3.
Fig. 4.
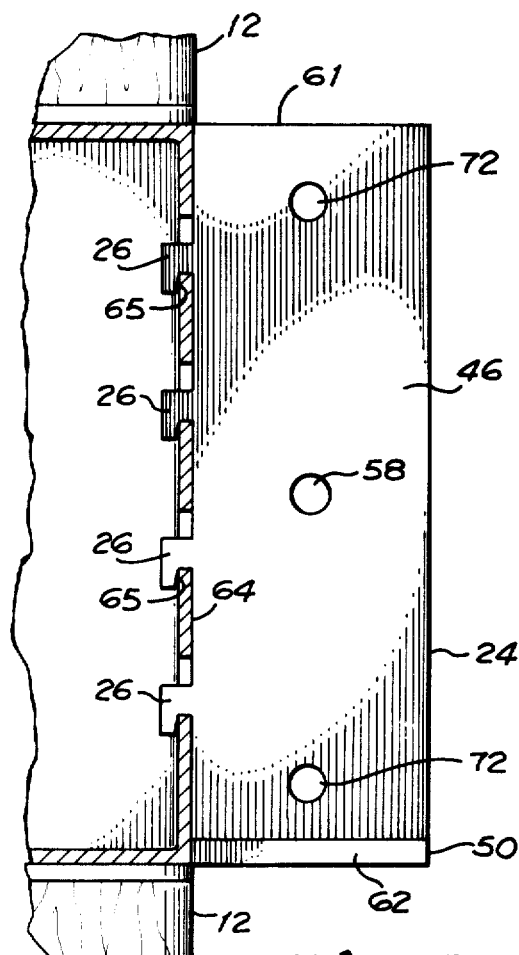
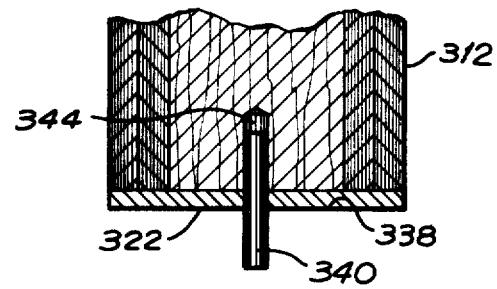
Fig. 5.
Fig. 10.

1

COLUMN-TO-BEAM CONNECTOR

DESCRIPTION

1. Technical Field

The present invention relates to connectors, and in particular, to connector assemblies for interconnecting vertical columns with horizontal beams.

2. Background Art

In the past, various types of connectors have been utilized to interconnect structural columns with beams to form the framework for buildings, storage racks and other structures. One type of known connector includes hook members or similar devices secured to an end portion of a horizontal beam to engage with slots or apertures formed in the sidewall of a column. In Gatch, U.S. Pat. No. 3,383,821, vertical posts are formed in a cruciform configuration with a column of slots vertically spaced along four of the side surfaces of the posts. Dogs or hooks extend transversely outwardly from the ends of horizontal beams to engage within slots formed in the columns. When a beam is connected to a column, the side surface of the beam bears against the surface of the column in which the slots are formed.

Another example of a hook type column-to-beam connector arrangement is disclosed by Donahue et al., U.S. Pat. No. 2,439,129, wherein a vertically elongate slot is formed in a tubular column to receive the free end portion of a vertically disposed bracket plate which is fixed to, and extends longitudinally outwardly from, the end of a horizontally disposed beam. The upper edge of the bracket plate is notched to hook with the column wall at the top of the vertical slot.

A further type of column-to-beam connector basically includes a circular collar having a vertical, central bore for engaging over the diameter of an upright, circular post. Transverse set screws threadly engage with the collar to press against the outer circumference of the post for securely locking the collar to the post at a desired elevation. A plurality of sockets are spaced around the outer margin of the collar and are open at the outer circumference of the collar. Each socket is tapered from top to bottom to match the shape of a plug which is fixed to the end portion of a horizontal beam. The beam is connected to the collar by sliding the plug downwardly into one of the vertical sockets of the collar. A connector constructed in this manner is disclosed by Best, U.S. Pat. No. 2,962,170.

The Best '170 patent also discloses another type of known column connector wherein a collar is composed of four quadrant segments. In cross-section each segment includes a central arcuate portion which curves approximately 90°, and flanges which extend radially outwardly from each end of the arcuate portion. Four such collar segments are assembled together to substantially encircle a circular post wherein the adjacent flanges of adjacent segments are spaced apart in close parallel relationship to each other by hollow, circular spacers. The segments are interconnected by capscrews which extend through horizontal holes provided in the flange portions of the collar segments and through the hollow spacers. Vertically spaced apart hooks extend longitudinally outwardly from the end portion of a horizontal beam to hook over the spacers to thereby interconnect the beam with the collar.

In a further type of known column-to-beam connector, a coupler is interposed between the adjoining end portions of adjacent columns to both interconnect the columns and attach a horizontal beam member to the columns. One such type of coupler connector includes a vertically slotted, outer circular collar member of the same cross-sectional shape and size as the two adjacent column members. The coupler also includes a pair of smaller diameter hollow plugs which are sized to slide within the inside diameter of the outer collar and the end portions of the circular columns. To assemble the framework, the end portion of a horizontal beam is slidably engaged through the radial slots formed in the outer collar and then one of the plugs is engaged downwardly into the collar until a notch formed in the lower end of the plug engages with a corresponding notch formed in the upper edge portion of the end of the beam member extending within the outer collar. Then the second plug is pushed upwardly through the inside diameter of the outer collar until an end notch, formed in the upper end of the plug, locks with a corresponding notch formed in the lower edge portion of the horizontal beam. Thusly assembled, the plugs extend above and below the height of the outer collar to engage within the inside diameter of an upper and lower column member, respectively. An example of this particular type of connector is disclosed by Wing, U.S. Pat. No. 3,747,965.

In another coupler type of known connector, a plug member is composed of four fins arranged perpendicularly to each other to form a cross shape. A central body constructed from a short length of square tubing is engaged over a central portion of the plug member with each of the four fins of the plug member extending into one of the corners of the central body. The central body includes an upwardly open slot in each of its four side walls for receiving a downwardly open slot formed in the lower edge end portion of a flat, horizontal rail member. To form frame structures with this particular type of connector, a slotted rail member is first engaged with a slot in a wall of the central body, and then the lower end portion of the plug member, which extends below the central body, is engaged within the hollow interior of a lower square tube while the upper end portion of the plug member, which extends above the central body, is engaged within the hollow interior of an upper tube or column. An example of this type of coupler construction is disclosed by Vivoli, U.S. Pat. No. 3,972,638.

A further coupler type of known connector includes an elongate spindle which engages within the end portions of adjacent column members. The spindle also extends through a vertical opening formed in the end portion of a horizontal beam member disposed between the two vertically adjacent column members. Examples of coupler connectors utilizing this particular construction are disclosed by Perry et al., U.S. Pat. No. 3,429,092, and Hughes, U.S. Pat. Nos. 3,594,971 and 3,783,565.

In another type of known column-to-beam connector, a socket member is formed or imbedded within the end portion of either a vertical column or horizontal beam and a plug member is formed or fixed to a corresponding beam or column, respectively, for engaging within the socket. One such type of a socket-and-plug connector includes a double tapered socket imbedded within each corner of a horizontal concrete slab for receiving an upwardly extending, tapered plug affixed to the upper end portion of a lower column and for also receiving a downwardly extending, tapered plug fixed to the lower end of an upper column. An example of a socket-and-plug connector of this type is disclosed by U.S. Pat. No. 3,378,971 to Singer et al.

In a further type of prior socket-and-plug connector, a formed metal loop extends upwardly from the upper end portion of a vertical post to receive therein a plug or tendon formed in the end portion of a horizontal bar or beam member. A second metal loop is pivotally attached to the horizontal bar at a location longitudinally inwardly from the tendon to extend beyond the end of the horizontal bar to encircle the post after the tendon has been inserted within the post loop. A socket-and-plug connector incorporating this general construction is disclosed by Pence et al., U.S. Pat. No. 958,276.

Another socket-and-plug type of known connector includes U-shaped strap members which engage over the end and two sides of the upper end portion of a lower column and the end and two sides of the lower end portion of an upper column. A circular opening is formed in the end portion of one of the strap members while a tapered plug or projection is fixed transversely to the end portion of the opposite strap member to snugly fit within the hole or opening. An example of a socket-and-plug type of connector utilizing this particular construction is disclosed by Matsushita et al., U.S. Pat. No. 3,818,671.

DISCLOSURE OF THE INVENTION

The present invention relates to a novel connector assembly for interconnecting vertical columns with the end portions of horizontal beams which, in basic form, is characterized by a vertically elongate connector member having a top wall, a bottom wall, and side walls which define a hollow, block shape. A plurality of vertically spaced apart apertures are centrally disposed along the height of each of the connector member side walls. The coupler also includes joiner inserts for attaching the connector member to an end portion of a column or between two adjacent columns. Each joiner insert includes a flat, liquid impervious, flange section disposed transversely to the length of the column and a circularly shaped stud fixedly attached to and extending normally from one side of the flange section to engage within a central opening formed in the end wall of the block member. The joiner insert also includes a tubular plug section which extends normally outwardly from the side of the flange section opposite the circular stud to snugly and slidably engage within a longitudinally open socket formed in each end portion of each column member.

The connector assembly of the present invention further includes formed brackets for connecting the end portion of horizontal beams to a connector member. Each bracket includes an elongate, upright wall slidably receivable within a vertical slot extending longitudinally inwardly from the end of the beam and extending the full depth of the beam. The bracket also includes a heel plate disposed transversely to, and fixedly attached to the bottom edge of, the upright wall to underlie and vertically support the end portion of the beam. A plurality of vertically spaced apart hook members extend outwardly from one edge of the bracket vertical wall beyond the end of the beam in a direction longitudinally opposite the length of the beam. The hook members slidably engage within the correspondingly spaced connector member apertures to thereby securely lock the bracket with the coupler to thereby connect the beam with a column. A horizontal through hole is formed in a bracket vertical well in alignment with a corresponding through hole formed in the end portion of the horizontal beam to receive a capscrew therethrough for securing the bracket to the beam end portion.

According to another aspect of the present invention, the connector member of the coupler is composed of side walls which define a hollow tubular shape having open end portions. A column of vertically spaced apart apertures are centrally disposed along the height of each of the connector member sidewalls for receiving the hook members of the bracket. The coupler also includes joiner inserts for attaching the connector member to the end portion of a singular column or to the end portions of vertically abutting columns. The joiner insert includes a flat flange section disposed transversely to the length of the columns. A first hollow plug section extends transversely from one side of the flange section to snugly engage within an open end portion of the connector member, with the end of the connector member bearing against one side of the flange section. The joiner insert also includes a second hollow plug section extending transversely outwardly from the side of the flange section opposite the first plug member to slidably engage within a longitudinally open socket formed in each end portion of each column member. Both the first and second plug sections are composed of planar sidewalls which extend transversely to a face of the flange section, and thus are tubular in cross section. The flange section has a central opening which is aligned with the interiors of the two plug sections to thereby form a passageway through the joiner insert.

In a further aspect of the present invention, the sidewalls of the connector member define a tubular shape which is open at each end for slidably receiving the abutting end portions of two columns. A plurality of vertically spaced apart apertures are centrally formed along the height of each of the connector member sidewalls. The connector member also includes stops which extend inwardly from the sidewalls into the interior of the connector member at a location generally centrally along its height. The stops form an abutment for bearing against the end portions of the two columns members which are engaged within the connector member.

It is a primary object of the present invention to provide a connector assembly capable of quickly and easily interconnecting a plurality of columns in vertically aligned relationship and to conveniently, quickly and securely interconnect horizontal beams to either the upper or lower end of a column or between two vertically adjacent columns to form structural frames in desired configurations.

Another object of the present invention is to provide a connector assembly composed of components which can be preattached to the structural frame members so that they can be quickly assembled at a job site with a minimum of cost and without the need for highly skilled labor.

A further object of the present invention is to provide a connector assembly for interconnecting structural columns with structural beams without the need for nails or similar hardware.

One more object of the present invention is to provide a column-to-beam connector assembly composed of a minimum number of components.

Yet another object of the present invention is to provide a column-to-beam connector assembly which is rugged enough to safely carry the loads imposed on the structural columns and beams.

An additional object of the present invention is to provide a column-to-beam connector assembly especially adapted to interconnect wooden columns with wooden beams and which is sufficiently aesthetically pleasing in appearance to enable the assembly to remain exposed to the interior or exterior of a dwelling, office or similar structure.

One more object of the present invention is to provide a column-to-beam connector assembly which permits connection of several horizontal beams to a single column.

BRIEF DESCRIPTION OF THE DRAWINGS

FIG. 1 is a fragmentary, isometric view illustrating a building frame structure assembled with connector assemblies typically constructed according to the present invention;

FIG. 2 is an enlarged, isometric, partially exploded, fragmentary view illustrating the interrelationship between the connector assembly illustrated in FIG. 1 typifying the present invention, and typical structural column and beam members used in the formation of a building frame structure;

FIG. 3 is a greatly enlarged, cross-sectional view of the typical embodiment of the joiner insert illustrated in FIG. 2, taken substantially along lines 3—3 thereof and rotated 180°;

FIG. 4 is a greatly enlarged, cross-sectional view of the typical embodiment of the connector member illustrated in FIG. 2, taken substantially along lines 4—4 thereof;

FIG. 5 is a greatly enlarged, partial side elevational view of the typical embodiment of the present invention illustrated in FIG. 2, with the connector member shown in cross section;

BEST MODE FOR CARRYING OUT THE INVENTION

Figure 6:
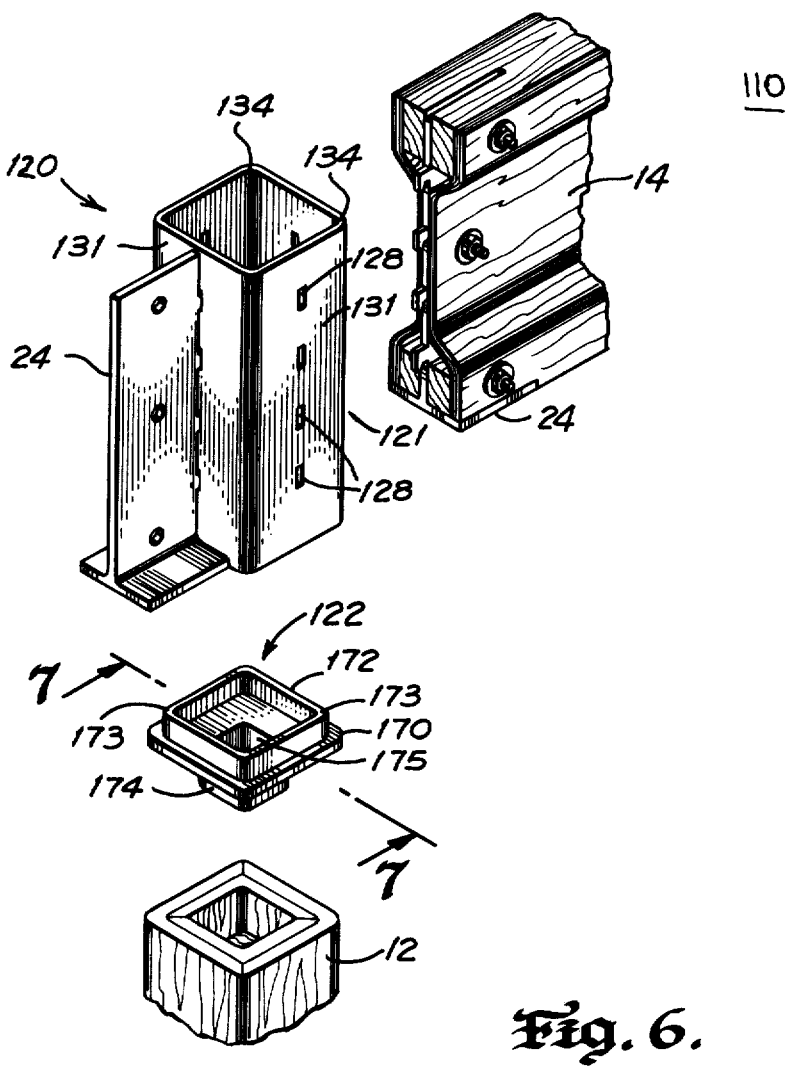
FIG. 6 is an enlarged, isometric, fragmentary, partially exploded view of another connector assembly typically constructed according to the present invention.

Referring initially to FIG. 1, connector assembly 10, constructed according to the best mode of the present invention currently known to applicant, is utilized to interconnect vertical columns 12 with horizontal beams 14 to form a framework 16 for building 18. As illustrated in FIGS. 1-4, columns 12 are square in cross section and are of a length sufficient to extend the full height separating adjacent stories of building 18. Also, beams 14 have a cross-sectional shape generally in the form of an I-beam with upper and lower flange portions 29, which are substantially wider than web portion 30. Preferably, both columns 12 and beams 14 are constructed from wooden material having a decorative exterior thereby enabling the members to remain exposed to the interior or the exterior of a dwelling or office. Columns 12 can be either hollow or solid in form depending on the load required to be carried thereby and whether or not wires, tubes and pipes for utilities are routed through the columns.

In the assembly of framework 16, columns 12 are connected in end-to-end relationship by coupler 20 which engages with the adjacent end portions of the abutting columns 12. According to a preferred typical embodiment of the present invention, each coupler 20 is composed of a connector member 21 and a pair of joiner inserts 22. Each connector member 21 is formed in the shape of a hollow block and disposed between the ends of adjacent columns 12 by joiner inserts 22 which are interposed between the end of each column 12 and the adjoining end of connector member 21. Horizontal beams 14 are connected to columns 12 by T-shaped brackets 24 which engage with a corresponding connector member 21. Brackets 24 are pre-engaged with the end portion of the beams and include a series of vertically-spaced hooks 26 which engage with correspondingly spaced slots 28 formed in the sidewalls of connector member 21. Next, referring primarily to FIGS. 2 and 4, each connector member 21 is formed in the shape of a vertically elongate hollow block having a height slightly greater than the depth of beam 14 and composed of four substantially planar, relatively thin sidewalls 31 which are capped at their tops and bottoms by flat, relatively thin end walls 32. Connector member 21 preferably has a square cross-sectional shape of a size substantially the same as the size and shape of columns 12. The corners 34 between adjacent sidewalls 31 are rounded to match the contour of the corners of columns 12. Each sidewall 31 is provided with a plurality of aligned, vertically spaced apart slots 28 which are horizontally centered on each sidewall 31. Each slot 28 is itself rectangular in form having a height substantially greater than its width. Also, a circular through hole 36 is centrally formed within each end wall 32.

For economy of construction, preferably sidewalls 31 of connector member 21 are composed of commonly available structural material, such as square steel tubing. Also, ideally end walls 32 are also composed of steel plates welded or otherwise fixed to the top and bottom edges of sidewalls 31. Although member 21 is square in cross section to match the cross-sectional shape of columns 12, member 21 can also be configured in other cross-sectional shapes, such as circular, triangular or hexagonal, to either match, or not match, the cross-sectional shape of the columns.

Referring specifically to FIGS. 2 and 3, couplers 20 also include joiner inserts 22 for attaching a connector member 21 to the top or bottom of a column 12 or for disposing member 21 between two vertically adjacent columns 12. Each joiner insert 22 includes a flat, relatively thin flange section 38 having a generally square shaped outer contour corresponding to the cross-sectional outline of connector members 21 and columns 12. Joiner insert 22 also includes a centered first plug section in the form of a circularly shaped stud 40 extending normally outwardly from one side of flange section 38. Stud 40 is sized to snugly and slidably engage within hole 36 formed in connector block end wall 32 to thereby laterally constrain joiner insert 22 relative to connector member 21. Additionally, joiner insert 22 includes a hollow, open-ended, square shaped second plug section 42 which extends normally outwardly from the side of flange section 38 opposite stud 40. Ideally, plug section 42 is longitudinally aligned with stud 40.

As best illustrated in FIG. 3, plug section 42 is sized to snugly slidably engage within a correspondingly shaped hollow interior end portion of column 12. If column 12 is tubular in cross section, the hollow interior end portions are formed by the sidewalls of the columns themselves; however, if column 12 is solid in cross section, a longitudinally inwardly extending socket 44 must be formed in each end thereof.

Although plug section 42 is composed of a relatively thin perimeter wall shaped in a square cross section, the plug section can alternatively be formed from a solid member and also in other cross-sectional shapes, such as square and round so long as it matches the cross-sectional shape of the hollow interior of the end portions of column 12. Furthermore, preferably, stud 40 is formed in a circular shape to allow connector member 21 to rotate about its longitudinal axis to accommodate minor angular misalignments between columns 12 and beams 14; however, in most applications this misalignment is minimal and thus, stud 40 can be formed in other shapes, such as square or triangular.

Now referring primarily to FIGS. 1, 2 and 5, each connector assembly 10 also includes generally T-shaped brackets 24 each constructed in part from a thin, vertical wall 46 which is slidably receivable within a narrow slot 48 formed in each end portion of beam 14. Slot 48 extends longitudinally inwardly from the end of beam 14 and also runs the full depth of the beam. To minimize the coupling forces imposed on beam 14, ideally slot 48 is laterally centered along the width of the beam to lie along the line of symmetry of the beam.

Each bracket 24 also includes a heel plate 50 disposed transversely to the bottom edge of wall 46 to underlie the notched portion 52 of beam 14, thereby vertically supporting the end portion of the beam. To safely carry the weight borne by beam 14, ideally heel plate 50 is somewhat thicker than the thickness of vertical wall 46. Moreover, heel plate 50 can be integrally formed with vertical wall 46 or fixed thereto by any convenient mens, such as by welding. Rather than being formed with a notch 52, beam 14 can be formed without such a notch and heel plate 50 can simply underlie the lower edge of the beam. Also, the heel plate could be made somewhat narrower than the width of beam flange 29 so that it is not readily visible.

Bracket 24 is secured to the end portion of a beam 14 by any convenient standard hardware, such as central capscrew 54, which extends through a horizontally disposed hole 56 provided in the web portion 30 of beam 14 and through aligned hole 58 provided in bracket vertical wall 46 to engage with nut 60. Central capscrew 54 is supplemented by an additional pair of capscrews 68 located above and below central capscrew 54. Capscrews 68 extend through holes 70 formed in the flange portion 29 of beam 14 and through aligned holes 72 formed in bracket vertical wall 46 to engage with nuts 74. When assembled with beam 14, the upper edge 61 of bracket vertical wall 46 is substantially flush with the top surface of the beam and the side or transverse edges 62 of heel plate 50 are flush with the sides of beam web portion 29 so that the envelope of bracket 24 remains within the cross-sectional profile of beam 14.

Bracket 24 further includes a plurality of vertically spaced apart, downwardly open hooks 26 which extend outwardly from the edge 64 of bracket 24 which is flush with the end of beam 14. Preferably, hooks 26 are coplanar with, and of the same thickness as, bracket vertical wall 46. The vertical spacing of hooks 26 corresponds to the vertical spacing of connector member slots 28 for slidably receiving hooks 26 therein. Once hooks 26 are engaged within slots 28, bracket 24 can be slid downwardly until the sloped undercut edge 65 of hooks 26 bear against the lower edge portion of each slot 28 to lock hooks 26 within slots 28.

To assemble a frame structure, such as frame structure 16 shown in FIG. 1, a connector block 21 is attached to one end of a column 12 by engaging joiner insert stud 40 within connector member hole 36 and then sliding joiner insert 22 into column socket 44. To interconnect two columns, a joiner insert 22 is interposed between each of connector member 21 and the abutting end of the columns. Before horizontal beams 14 are assembled with columns 12, vertical walls 46 of bracket 24 is first engaged within beam slot 48 and then secured therein by capscrews 54 and 68 and nuts 60 and 74, respectively. Thereafter, the beam can be locked with connector member 21 by simply sliding bracket hooks 26 into connector member slots 28 and then pushing downwardly until the hooks lock with the bottom edge of the slots. With bracket 24 thusly engaged with connector member 21, beam 14 is securely held in place and restrained against downward lateral or twisting movement relative to columns 12. If required, a beam 14 can be attached to each sidewall 31 of member 21. In FIG. 1, columns 12 are positioned at the corners of framework 16 and thus, two beams 14 are attached to each connector block 21. The unused connector block slots 28 can be closed off with plugs or caps, not shown, in a manner known per se.

It will be appreciated that constructing connector assembly 10 in the manner described above enables columns 12 and beams 14 to be conveniently and quickly assembled together at a job site without the need for additional fasteners, such as nails, or the need for highly skilled labor. Once beams 14 have been erected with columns 12, floor and ceiling joists, not shown, can be conveniently attached to the beams through the use of conventional joist hangers, also not shown.

It will be further appreciated that connector 10 is shaped and sized to correspond to the shape and size of columns 12, thereby enabling the connector to remain exposed to the exterior or interior of a building or dwelling. Furthermore, if required, frame structure 16 can be quickly and conveniently disassembled for subsequent reuse. This capability is especially advantageous if connector assembly 10 is used to assemble the beams and columns of a storage rack or similar structure.

An alternative typical embodiment of a joiner insert 322 for attaching a connector member 21 to the top or bottom of a column 312, or for disposing member 21 between two vertically adjacent columns 312, is illustrated in FIG. 10. Joiner insert 322 includes a flat, thin flange section 338 having an outer contour corresponding to the cross-sectional outline of column 312. Joiner insert 322 also includes a central stud 340 which is fixedly secured to, and extends normally outwardly from opposite sides of, flange section 338. One end of stud 340 snugly slides within hole 36 formed in connector block end wall 32 while the opposite end of stud 340 slides within a blind hole 344 provided in the end portion of column 312 to thereby restrain any lateral movement between column 312 and connector member 21.

Figure 7:
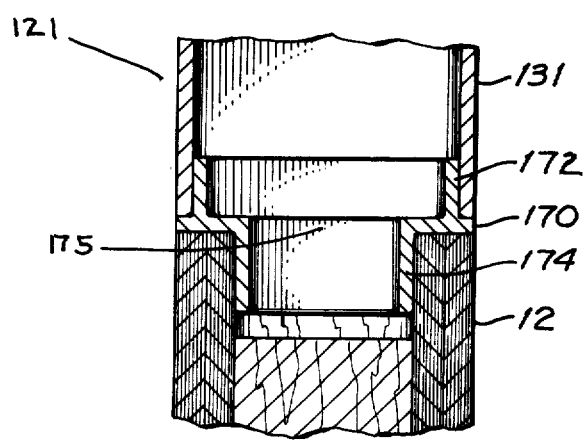
FIG. 7 is a greatly enlarged, cross-sectional view of the typical embodiment of the joiner insert illustrated in FIG. 6, taken substantially along lines 7—7 thereof.

An alternative typical embodiment of a connector assembly 110 constructed according to the present invention is illustrated in FIGS. 6 and 7 wherein a coupler 120 is used to interconnect columns 12. Each coupler is composed of a connector member 121 and a pair of joiner inserts 122. Each connector member 121 is formed in the shape of a hollow, tubular member having open ends. Connector member 121 includes four substantially planar, relatively thin sidewalls 131, which together form a square, cross-sectional shape of a size substantially the same as the shape and size of columns 12. As with connector member 21 shown in FIGS. 2–4, preferably the corners 134 formed by adjacent sidewalls 131 of connector member 121 are rounded to match the contour of the corners of columns 12. Also, as with connector member 21, preferably sidewalls 131 of connector member 121 are composed of commonly available structural material, such as square steel tubing. Furthermore, although connector member 121 is illustrated as square in cross section to match the cross-sectional shape of columns 12, member 121 can also be constructed in other cross-sectional shapes, such as circular, triangular or hexagonal. Each sidewall 131 is provided with a vertical row of aligned, vertically spaced apart slots 128 which are horizontally centered on each of the sidewalls 131. Each slot 128 is itself rectangular in form, having a height substantially greater than its width.

Joiner inserts 122 attach connector members 121 to the top or the bottom of a column 12 or alternatively dispose connector members 121 between two vertically adjacent columns 12. Each joiner insert 122 includes a flat, relatively thin peripheral flange section 170 having a generally square shaped outer contour corresponding to the cross-sectional outline of connector members 121 and columns 12. Joiner insert 122 also includes a first, hollow plug section 172 which extends normally outwardly from one side of flange section 170. Plug section 172 is constructed from a relatively thin perimeter wall shaped in a square cross section and sized to snugly slidably engage within the correspondingly shaped end portion of connector member 121. Accordingly, the outside radius of the corners 173 of the perimeter wall correspond to the inside radius of sidewalls 131 of connector member 121.

Joiner insert 122 also includes a second plug section 174 extending normally outwardly from the side of flange section 170 opposite from plug section 172. Plug section 174 is formed from four relatively thin wall panels, each extending transversely outwardly from one surface of flange section 170 to form a hollow, square cross section of a shape and size corresponding to the hollow interior of the end portion of column 12 to slidably engage therein. Preferably, second plug section 174 is longitudinally aligned with first plug section 172 and also centered relative to flange section 170, which flange section includes an opening 175 in registry with the hollow interiors of first and second plug sections 172 and 174, respectively.

Ideally, at least the flange section 170 of joiner insert 122 is constructed from material, such as plastic or metal, which is impervious to water, so that the flange section serves as a barrier to prevent moisture from reaching one column 12 from another. Also, the hollow construction of connector member 121 and joiner insert 122 enables electrical and telephone wires, water pipes, and other such utility lines and conduits to be conveniently routed through these connector member components and through hollow columns 12.

Connector member 121 and joiner insert 122 of coupler 120 can be used to interconnect vertically adjacent columns 12 in the same manner as connector member 21 and joiner insert 22, illustrated in FIGS. 1–5. Plug section 174 of joiner insert 122 is slidably engagable within the hollow end portion of a column 12 and then plug section 172 is slidably engagable within the open end portion of connector member 121 to thereby sandwich flange section 170 between the adjoining ends of column 12 and connector member 121. Thereafter, beams 14 can be connected to connector member 121 through T-shaped brackets 24 in the same manner as described above relative to connector member 21 illustraed in FIGS. 1–5.

Figures 8, 9:
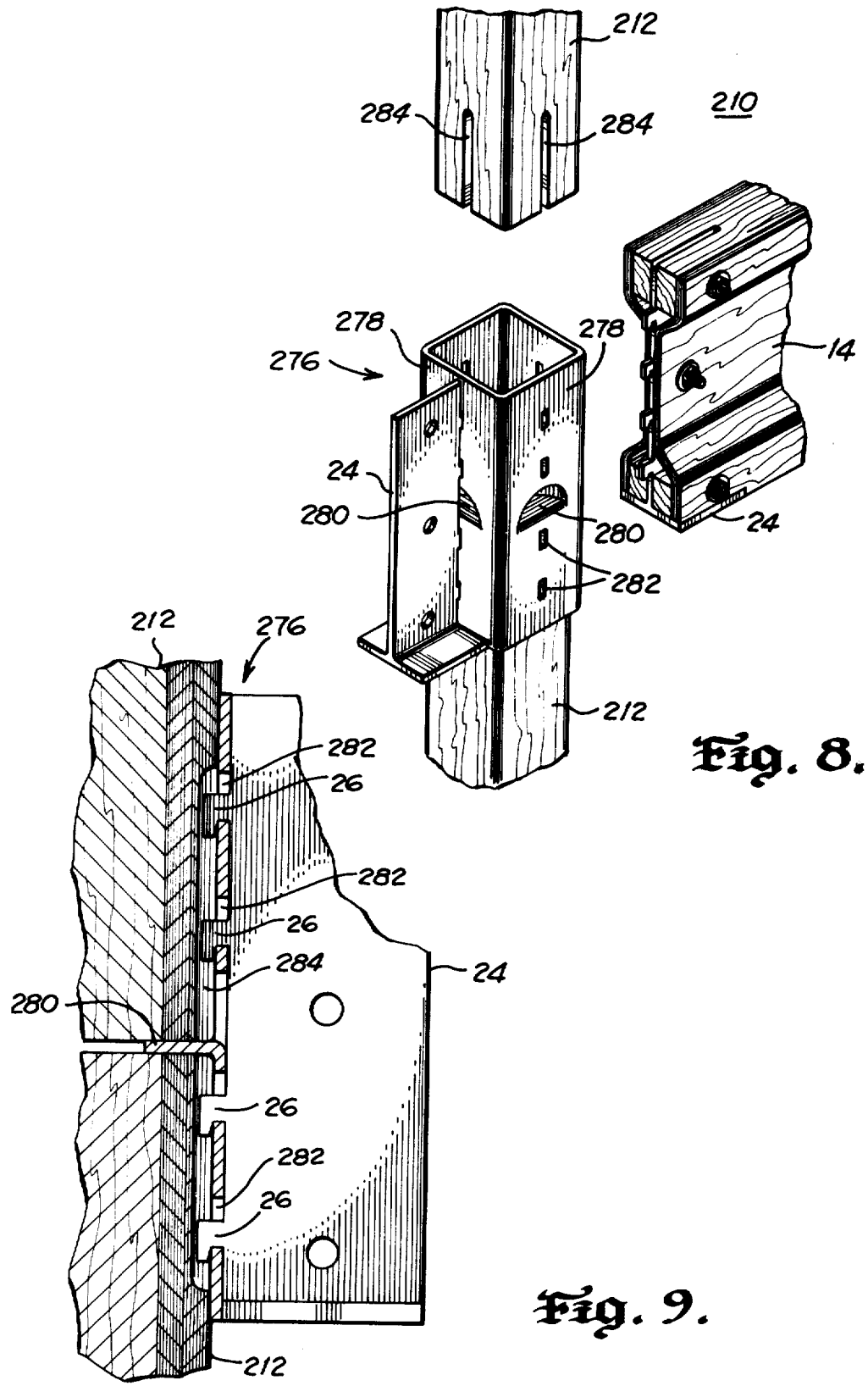
FIG. 8 is an enlarged, isometric, fragmentary, partially exploded view of a further connector assembly typically constructed according to the present invention.
FIG. 9 is a greatly enlarged, partial side elevational view of the typical embodiment of the present invention illustrated in FIG. 8, with the connector member shown in cross section.

FIGS. 8 and 9 illustrate a further typical embodiment of the present invention, wherein connector assembly 210 is composed of a connector member 276 formed in the shape of a hollow, open-ended, tubular member for receiving the adjacent end portions of columns 212. Each connector member 276 includes four substantially planar, relatively thin sidewalls 278 which define a square cross section having an inside area slightly larger than the cross-sectional area of columns 212 to slidably, snugly receive the end portions thereof. The engagement of the end portions of columns 212 with connector member 276 is limited by stops 280 which extend transversely inwardly from each sidewall 278 into the hollow interior of connector member 276 to vertically divide the connector member into top and bottom sections. Preferably, stops 280 are each formed by piercing a downwardly open arc into each sidewall 278 and then folding the pierced portion inwardly to an orientation normal to the plane of its corresponding sidewall.

Each sidewall 278 of connector member 276 includes a vertical row of aligned, spaced apart slots 282 which are trnasversely centered on each sidewall. Each slot 282 is itself rectangular in form having a height substantially greater than its width. Although in FIGS. 8 and 9 four slots 282 are shown formed in each sidewall 278, two above and two below each stop 280, a fewer or greater number of slots can be utilized. It is, however, preferable that the same number of slots 282 be located above and below each stop member 280 and that the slots 282 are uniformly spaced relative to stop member 280 so that connector member 276 is verically symmetrical, thereby enabling it to be positioned in the manner illustrated in FIGS. 8 and 9 or rotated 180° into a position up-side-down from the orientation shown in the Figures.

As with connector assembly 10 illustrated in FIGS. 1–5, and connector assembly 110 illustrated in FIGS. 6 and 7, connector assembly 210, as illustrated in FIGS. 8 and 9, also includes T-shaped brackets 24 which engage with the end portions of beams 14 to interconnect the beams with columns 212 through connector member 276 in the manner described above. The vertically spaced hooks 26 of bracket 24 engage within slots 282 formed in connector member sidewalls 278 and lock with the lower edge portions of the slots. To provide clearance for hooks 26, a longitudinally extending, transversely centered groove 282 is formed in the end portion of each side surface of column 212. Preferably, the length of grooves 284 is short enough to not extend beyond the end of connector member 276 when column 212 is engaged with the connection member. Also, ideally, the depth of each groove 284 is only slightly greater than the distance which hooks 26 extend inwardly from connector member sidewalls 278 to thereby minimize any reduction in structural strength of columns 212 which might be caused thereby.

Connector assembly 210 can be utilized to assemble a frame structure, such as one similar to frame structure 16 shown in FIG. 1, by engaging connector member 276 over the end of a column 212 to connect the end of a beam 14 to either the upper or lower end of the column. Also, connector member 276 can be engaged over the adjoining end portions of two adjacent columns 212 to interconnect the two columns. Thereafter, beam 14 can be attached to connector member 276 by simply sliding bracket hooks 26 into block member slots 282 and then pushing downwardly until the hooks lock with the bottom edge of the slots. With bracket 24 thusly engaged with connector member 276, beam 14 is securely restrained against downward, lateral, or twisting movement relative to columns 212.

The invention may be embodied in other specific forms without departing from the spirit or essential characteristics thereof. The various typical embodiments of the connector assembly, described above, are therefore to be considered in all respects as illustrative and not restrictive. The scope of the present invention is set forth in the appended claims rather than being limited to the specific typical connector assembly embodiments as set forth in the foregoing description.

We claim:

1. A connector assembly for connecting vertical wooden columns with the end portions of horizontal wooden beams, said connector assembly comprising, in combination:
   (A) a connector member composed of side walls and planar top and bottom end walls for closing off substantially the entire end portions of said side walls to form said connector member in a hollow block shape, said end walls each having portions defining a small, centrally located opening extending therethrough, said connector member:
   having a plurality of receiving apertures integrally formed with said connector member side walls and disposed along substantially the entire height of the side walls;
   (B) joiner insert means for interconnecting the ends of said connector member with the adjacent end portions of a corresponding wooden column, said joiner insert means including:
   a flat liquid impervious flange section for overlying substantially an entire connector member end wall;
   a first plug section extending normally from one side of said flange section to slidably engage within a corresponding connector member end wall central opening; and
   a second plug section extending normally from the side of said flange section opposite said first plug section to slidably engage within a socket formed in the end portion of the column; and
   (C) a bracket having:
   an elongate upright wall engageable within the end portion of a wooden beam, said upright wall having a forward edge adjacent the end of the wooden beam;
   a heel plate disposed transversely to, and fixedly attached to the bottom edge of said upright wall to underlie and support the bottom edge of the beam; and
   latch means extending outwardly from the forward edge of said upright wall to slidably, detachably engage with said connector member receiving apertures to securely lock said bracket with said connector member.

2. A connector assembly according to claim 1, wherein:
   the height of said bracket upright wall being substantially equal to the height of the connector member; and
   said latch means comprising a plurality of downwardly open hook members extending outwardly from the forward edge of said bracket upright wall and slidably engageable within said connector member apertures, said hook members being spaced apart along substantially the entire height of said upright wall forward edge at distances apart from each other corresponding to the spacing of said connector member apertures.

3. A connector assembly according to claim 2, wherein said connector member side walls are substantially planar; and the receiving apertures are disposed along a vertical row extending centrally along the height of each connector member planar side wall.

4. The connector assembly according to claim 2, wherein said bracket heel plate having a forward edge portion disposed substantially coplanar with the forward edge portion of said bracket upright wall, said heel plate forward edge portion extending transversely outwardly from both sides of said bracket upright wall forward edge portion for bearing against the adjacent connector member side wall.

5. A connector assembly according to claim 1, wherein said first plug section includes a circularly shaped stud fixedly attached to said flange member.

6. A connector assembly according to claim 1, wherein one of said plug sections is tubular in cross section.

7. A connector assembly according to claim 6, wherein said tubular plug section includes a plurality of flat side walls extending transversely to the plane of said flange section.

8. A connector assembly according to claim 1, wherein said first and second plug sections comprise a circularly shaped stud fixed relative to said flange member.

* * * * *